UNITED STATES PATENT OFFICE.

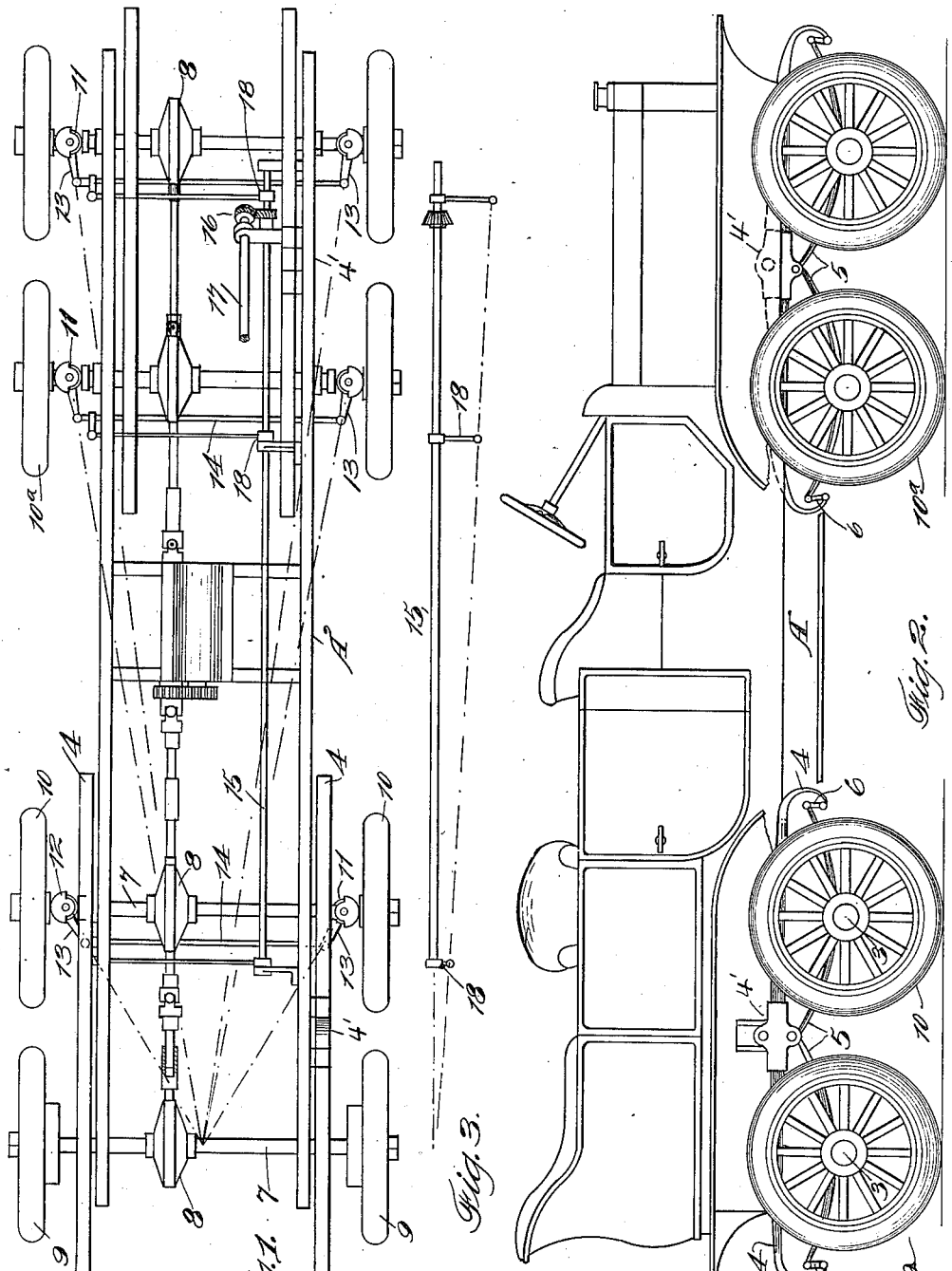

CHARLES F. RODIN, OF SAN FRANCISCO, CALIFORNIA.

AUTOMOBILE.

1,004,907. Specification of Letters Patent. Patented Oct. 3, 1911.

Application filed April 11, 1910. Serial No. 554,819.

*To all whom it may concern:*

Be it known that I, CHARLES F. RODIN, a citizen of the United States, residing in the city and county of San Francisco and State of California, have invented new and useful Improvements in Automobiles, of which the following is a specification.

My invention relates to improvements in automobile construction, and it consists in the mounting of the machine upon four pairs of independent bearing wheels, with means whereby said wheels may be turned in unison, and proportionately to their distance from the axis of movement so that the machine may be guided from point to point.

It also consists in a combination of parts, and in details of construction which will be more fully explained by reference to the accompanying drawings, in which—

Figure 1 is a plan view of the machine with the body removed. Fig. 2 is a side elevation, showing the spring mounting. Fig. 3 is a view of steering shaft and rocker arms of different length, showing in dotted lines the angular line through their outer ends and the shaft axis.

It is the object of my invention to provide a means for steering the machine in which a number of pairs of bearing-wheels are employed, and which wheels may all be driven from a common motor; and also to provide a novel spring mounting for the body of the machine.

As shown in the drawings, A is a chassis or frame of a motor vehicle, which in the present case is shown to be supported by four pairs of wheels, preferably grouped so that two pairs will be near the front, and two pairs near the rear end of the machine.

Between the wheel axles 3 and the frame are fixed the supporting springs. As shown these springs consist of an upper arched spring 4 having an attachment 4' clipped to the frame of the vehicle, and the ends curved around into a C form, and this spring is here shown as extending substantially beyond the outer peripheries of the wheels.

5 are intermediate springs arched in the reverse direction having their centers clipped to the wheel axles 3, and the outer ends connected by links or hangers 6 with the ends of the spring 4. The inner ends of the springs 5 are connected with the frame of the vehicle at a point contiguous to the attachment 4' of the upper spring 4 to the frame. This construction provides a very easy riding machine, and the rear wheels oscillate about the attachment.

The axles consist of exterior sleeves 7 which are non-revoluble, and interior revoluble shafts having bevel-gears contained within gear casings 8, which casings contain the differential gears as is usual in such constructions, and not here shown. The revoluble axles of the rearmost wheels extend into the hubs of the wheels 9 which are fixed to and revoluble with these axles. The other wheels are all connected with their driving shafts by universal joints, as shown at 11, so that when these wheels 10 are turned for the purpose of steering the machine, power may still be transmitted to drive them by reason of this universal joint. This joint may be made in any usual or suitable manner and inclosed in the casing as shown at 12, to prevent the admission of dirt.

It will be manifest that the steering-wheels must be turned to different angles in order to follow smoothly when turning to one side or the other. In the present case, the rearmost wheels 9 are the ones about which the turning takes place. The other wheels 10 and 10ª are swiveled or turnable about the universal joints 11 by means of the usual steering knuckles so-called, and lever arms 13, and connecting rods 14. These rods and steering-knuckles are moved in unison by means of a longitudinally journaled shaft 15, to one portion of which the steering-gear 16 is connected, so that by turning the steering-post 17 by the usual hand-wheel, this shaft 15 will also be turned. Upon this shaft 15 are fixed rocker-arms 18, and to these rocker-arms the connecting rods 14 are united in such a manner that the movement of the rocker-arms will actuate the rods 14 and the levers 13 by which the wheels are turned.

It will be seen that in order to properly turn about the rearmost wheels which form the temporary turning fulcrum, it will be necessary for the front wheels to be turned to a considerably greater angle than the next pair, and these again are turned to a greater angle than the pair in front of the rearmost wheels so that whatever amount of turning is necessary for steering purposes, the wheels will always be proportionately turned so that each one will turn concentrically with relation to the others.

The peculiar spring mounting of the two pairs of wheels at each end, allows a tilting or oscillating movement of these wheels about the intermediate attachment of the springs so that as each pair of wheels pass over an irregularity, they may rise and fall without communicating the maximum movement to this attachment and to the vehicle frame, and the shocks are thus greatly diminished.

Having thus described my invention, what I claim and desire to secure by Letters Patent is—

An automobile having in combination two pairs of wheels, located near the rear and two pairs near the front of the machine, turnably journaled transverse shafts, and transmitting mechanism to rotate all the shafts in unison, the rear shaft having immovable bearings and having wheels fixed to its ends, the center of said wheel shaft being the radial point upon which the frame swings bodily, and the other shafts having jointed extensions to which the bearing wheels of said shafts are secured, rocker arms fixed to said jointed wheel shafts, a steering mechanism, a longitudinally journaled shaft turnable in unison with the steering wheel, rocker arms fixed to the longitudinal shaft and decreasing in length from the front to the rear, and connecting rods between said shaft and the rocker arms of the turnable wheels, whereby said wheels may be proportionately turned independently of the rear pair of wheels.

In testimony whereof I have hereunto set my hand in the presence of two subscribing witnesses.

CHARLES F. RODIN.

Witnesses:
CHARLES EDELMAN,
C. C. COOK.